April 19, 1927.
G. H. KNIGHT
1,624,954
BULL GEAR INCLOSURE FOR CRANK SHAPING MACHINES
Filed July 14, 1926
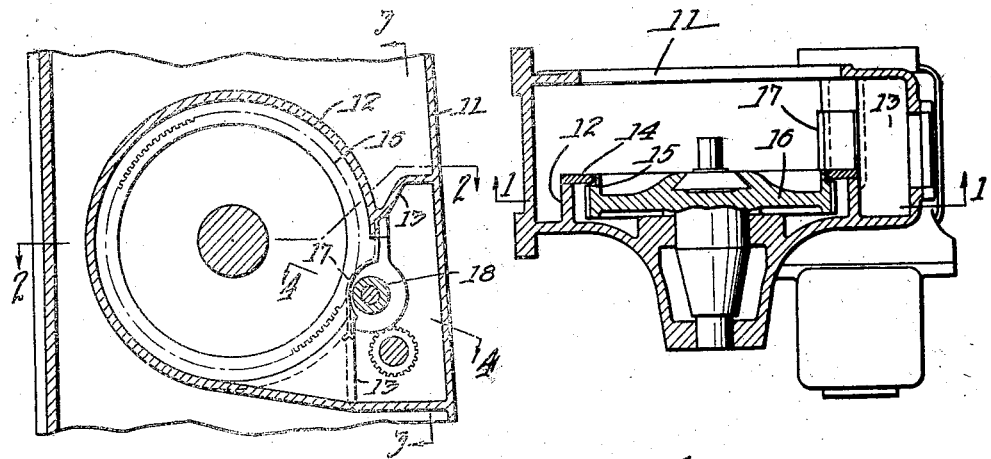
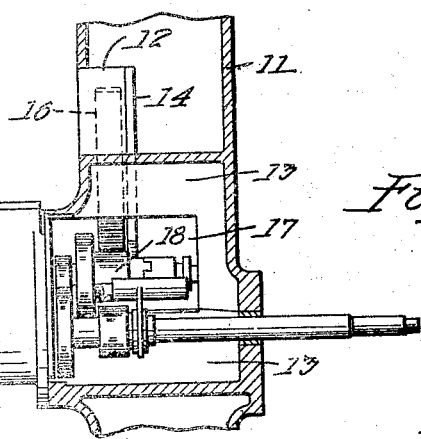
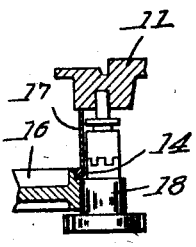
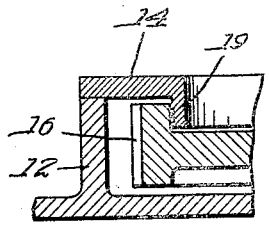
Inventor
George H. Knight
By Attorneys
Southgate Fay & Hardy Patented Apr. 19, 1927.

1,624,954

UNITED STATES PATENT OFFICE.

GEORGE H. KNIGHT, OF TORRINGTON, CONNECTICUT, ASSIGNOR TO THE HENDEY MACHINE COMPANY, OF TORRINGTON, CONNECTICUT, A CORPORATION OF CONNECTICUT.

BULL-GEAR INCLOSURE FOR CRANK-SHAPING MACHINES.

Application filed July 14, 1926. Serial No. 122,455.

This invention relates to the general class of machines known as crank shapers and using a bull gear and crank for operation. It is also capable of application to crank planers operated in the same way or any other machine of similar character. In these machines the bull gear is driven by a pinion on its periphery and delivers power from the side of the gear by means of a crank pin, the offset of which is adjustable.

The principal object of the invention is to provide an inclosure to enable the bull gear to run in the same compartment with the other driving gears, so as to arrange for the same lubrication of the bull gear as the other gears of the driving train. The invention also involves improvements in details of construction as will appear.

Reference is to be had to the accompanying drawings in which—

Fig. 1 is a vertical section taken on the line 1—1 of Fig. 2 of the base of a crank shaper showing a preferred form of this invention;

Fig. 2 is a horizontal section of the same taken on the broken line 2—2 of Fig. 1;

Fig. 3 is a central section of the same on the line 3—3 of Fig. 1, showing the gearing in side elevation;

Fig. 4 is a sectional view on the line 4—4 of Fig. 1; and

Fig. 5 is a radial sectional view similar to a part of Fig. 2, showing a modified construction coming within the principles of this invention.

Usually shapers are so constructed that the bull gear runs outside and cannot be given the same degree of lubrication as the other gears of the driving train; thus the gear that needs the most lubrication is lubricated the least. It is to obviate this difficulty and provide for a reduction in the trouble of lubrication that this invention is made. I have shown it as applied to a shaper having a hollow frame or column 11. This is provided with a flange 12 projecting from the side of the column 11 and of circular shape. It passes nearly around the circumference of the gear and connects with the walls 13 of a compartment containing the other driving gears illustrated in Fig. 3.

At the end of the flange 12 is a flat circular ring 14 fastened to the edge of the flange. Its inner edge just clears the flange 15 projecting from the bull gear 16. This ring 14 is of equal width all the way around and is continuous with the exception of a notch on one side to clear the hub of the bull pinion 18. The flange 15 or the ring 14 may be grooved to form an oil seal, but at any rate this surface between them is sealed to prevent the passage of oil outside so as to keep the oil within where it will lubricate the teeth of the bull gear 16.

Where the gap occurs in the walls 13 a cover plate 17 is provided and removably attached so as to permit of the removal of the gear 16 from the base. This cover plate fits closely between the ring 14 and the base. In this way the parts 12, 14 and 17 form a chamber in which the bull gear is located with the driving gears all in the same compartment. This compartment can be provided with a lubricant and all the gears, including the bull gear, will receive the same lubrication. This is a very important feature in this type of machine and results in the uniform lubrication of the bull gear and also in saving of time in keeping it in order.

It will be obvious that the joint formed between the plate 14 and the flange 15 is an important feature, for if no oil seal were provided the oil would get out rapidly. This can be provided in another way as shown in Fig. 5, in which no flange 15 is employed on the edge of the gear. In this case the ring 14 is provided with a circular inner projection 19 and this runs in contact with the inner edge of the projecting rim of the gear. In both cases any desired means can be provided for keeping the oil in. This provides an important new combination of the parts for driving a machine of this general character, which improves lubrication as has been stated.

Although I have illustrated and described only two forms of the invention, I am aware of the fact that other modifications can be made therein by any person skilled in the art without departing from the scope of the invention as expressed in the claims. Therefore, I do not wish to be limited in these respects, but what I claim is:—

1. In a machine of the character described, the combination with a driving crank gear and a train of gearing for driving it, of a compartment in which said train of gearing is located adapted to be supplied with a lubricant, said compartment having an opening through the wall through which the gear projects, means projecting from the frame of the machine for inclosing the gear except at its junction with said compartment and constituting an oil seal, whereby the gear and its driving gearing are located substantially in the same compartment and receive the same lubrication.

2. In a machine of the character described, the combination with a bull gear and a train of gearing for driving it, of a compartment in which said train of gearing is located adapted to be provided with lubrication, said compartment having an opening through the wall through which the bull gear projects in contact with the bull pinion, a circular flange projecting from the wall of the machine and encircling the bull gear except at its junction with said compartment, and a circular flat plate secured to the edge of said flange and projecting over the edge of the bull gear, the bull gear and the plate having surfaces constituting an oil seal.

3. In a crank shaper, the combination with a hollow frame having a compartment therein, driving gearing located in said compartment comprising a bull pinion, a bull gear adapted to be driven by the bull pinion for operating the machine, a circular flange integral with the hollow frame substantially surrounding the bull gear, a flat circular plate on the flange covering the outside of the bull gear and having cooperating surfaces with the bull gear provided with an oil seal all around to prevent the escape of the lubricant, thus forming a substantially circular compartment in which the bull gear is located communicating with the compartment in which the driving gearing is located, and a removably mounted cover plate covering the gap between the same to allow the bull gear to be removed.

4. In a crank shaper, the combination with a hollow frame having a compartment therein, driving gearing located in said compartment comprising a bull pinion, a bull gear adapted to be driven by the bull pinion, a flange in the hollow frame substantially surrounding the bull gear, a plate on the flange covering the outside of the bull gear and having cooperating surfaces with the bull gear provided with means to prevent the escape of the lubricant, thus forming a compartment in which the bull gear is located communicating with the compartment in which the driving gear is located, and a cover plate covering the gap between the same, removably mounted to allow the bull gear to be removed.

5. In a crank shaper, the combination with a bull pinion, a bull gear adapted to be driven by the bull pinion, a circular flange integral with the hollow frame substantially surrounding the bull gear, a flat circular plate on the flange covering the outside of the bull gear and having cooperating surfaces with the bull gear provided with an oil seal all around to prevent the escape of the lubricant, thus forming a substantially circular compartment in which the bull gear is located, and a cover plate covering the gap in the circular flange.

In testimony whereof I have hereunto affixed my signature.

GEORGE H. KNIGHT.